Patented Apr. 22, 1947

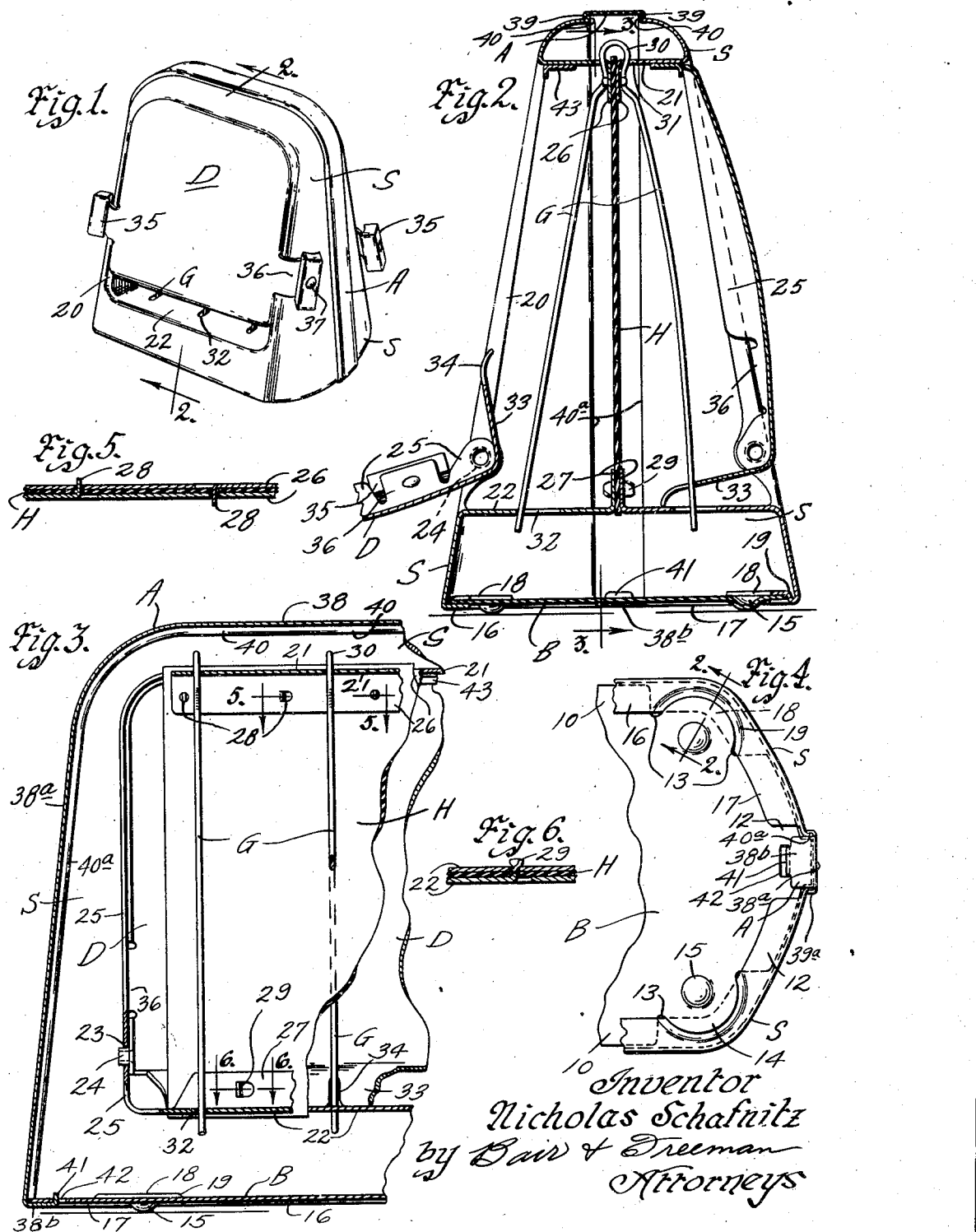

2,419,326

UNITED STATES PATENT OFFICE 2,419,326

TOASTER

Nicholas Schafnitz, St. Louis, Mo., assignor to Knapp-Monarch Company, St. Louis, Mo., a corporation of Missouri Original application October 16, 1941, Serial No. 415,236. Divided and this application October 19, 1943, Serial No. 506,813

3 Claims. (Cl. 99—395)

My present invention relates to a toaster, and particularly to constructional features of the casing thereof, the present application being a division of my co-pending application, No. 415,236, filed October 16, 1941, now Patent No. 2,336,753, issued Dec. 14, 1943.

One object of the invention is to provide a toaster casing which may be inexpensively and quickly fabricated from a base plate, a pair of side plates and a U-shaped assembly strip extending along the top and down the ends of the side plates, the side plates having door openings, and doors being hingedly mounted therein.

Another object is to provide the foregoing listed toaster casing elements so arranged that they fit together during assembly without the use of bolts, rivets or the like, and without the necessity of spot-welding parts together, the assembly strip, when finally applied, effecting a holding of the parts together against subsequent dislocation with respect to each other.

Still another object is to provide a novel heating element supporting means within the toaster casing structure consisting of the side plates of the casing having inwardly directed flanges adjacent the tops and bottoms of their door openings to engage and support the heating element of the toaster, the side plates being then retained in assembled position by the twisting of ears passing through the heating element and the insertion of grid wires, after which the parts are permanently retained assembled by the addition of the U-shaped assembly strip.

A further object is to provide the various parts of the toaster casing so designed that they may be readily stamped from sheet metal so that the only further operation for fabrication of the toaster is the placing of the parts together and the bending of certain sheet metal ears to retain them assembled.

With these and other objects in view, my invention consists in the construction, arrangement and combination of the various parts of my device whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which:

Figure 1 is a perspective view of a toaster embodying my invention;

Figure 2 is an enlarged vertical section thereof on the line 2—2 of Figure 1, with the lower right-hand corner showing a section on the line 2—2 of Figure 4;

Figure 3 is a vertical sectional view on the line 3—3 of Figure 2, showing only one end of the toaster, as the opposite end is symmetrical relative thereto;

Figure 4 is a bottom plan view of the toaster showing only one end, as the opposite end is similar in construction; and Figures 5 and 6 are enlarged sectional views on the lines 5—5 and 6—6, respectively, of Figure 3 to show the manner in which the heating element is supported.

On the accompanying drawing I have shown a toaster casing which consists essentially of four parts, a base plate B, a side plate S, a door D and an assembly strip A. Two identical side plates S and two identical doors D are used in the assembly of a toaster casing, as will hereinafter appear. In addition to the four elements just referred to, I have shown a heating element H and a grid wire G. The heating element H is shown as a vertical sheet of insulation, such as mica or the like, but no attempt has been made to show the resistance ribbon thereon, which forms no part of my present invention. Likewise, the supply cord and wiring for such resistance ribbon have been omitted.

The base plate B is a substantially flat plate having a pair of side marginal edges, indicated at 10, and a pair of end marginal edges indicated at 12. The plate is notched at each corner, with two notches 13, as best shown in Figure 4, whereby the portion between the notches constitutes an ear 14. Adjacent the ear 14 a downward depression 15 is formed in the metal of the base plate for the purpose of forming a supporting foot or button.

Each side plate S is provided with inwardly directed side flanges 16 which extend partially along the ends, as at 17, the transition area between 16 and 17 being indicated at 18. The transition areas 18 are humped upwardly, as indicated by semi-circular shading 19 in Figure 4, and as shown in cross-section at the lower right corner of Figure 2. Accordingly, the transition area 18 extends about the base plate ear 14, while the flanges 16 and 17 extend below the marginal edges 10 and 12 of the base plate when the parts are assembled.

Each side plate S is provided with a door opening defined by a pair of side flanges 20, a top flange 21 and a bottom flange 22. The flanges 20, 21 and 22 all extend inwardly and are of varying widths, as illustrated. The flanges 20 are narrowest, and are perforated, as at 23, for the purpose of receiving tubular pintles 24 pressed outwardly from side flanges 25 of the doors D. During assembly the pintles are forced between the flanges 20, which flanges are sprung apart enough to permit the pintles to enter the perforations 23, and the flanges then spring back and the door is thereafter retained in hinging relation with respect to the side plate.

The upper flanges 21 extend inwardly and terminate in marginal edges, bent downwardly to form heating element supporting flanges 26. Likewise, the bottom flanges 22 terminate in upwardly extending vertical flanges 27 for cooperating with the heating element H to support it. The element H is positioned between the flanges 26 and 27, as shown in Figure 2, and to retain the heating element against shifting in the vertical plane the flanges 26 have ears 28 extending through perforations in the heating element and perforations in the opposite flange 26, as shown in Figure 5. Similarly, the lower flanges 27 have ears 29 which may be twisted, as shown in Figure 6, to prevent the side plates from coming apart after their assembly relative to the heating element H.

For preventing the upper flanges 26 from separating from the heating element the ears 28 are not bent, but, instead, a U-shaped upper end 30 of the grid wire G is arranged to straddle the two flanges 26, the grid wire passing through slotted openings 31 in the flanges 21 for this purpose. Any desired number of the grid wires may be used, three of them being shown on the drawing. Their lower ends pass freely through slotted openings 32 in the lower flanges 22.

The grid wires G, in addition to spacing the slices of bread from the heating element H, serve as a tension means to keep the doors D in their upper position when the toaster is closed. The doors for this purpose are provided with inwardly extending flanges 33 at their lower ends, which are slotted, as at 34, to receive the grid wires, as shown in Figure 3. The left side of Figure 2 illustrates one of the doors open, while the right side illustrates the door closed, in which position the bottom of the groove 34 coacts with the grid wire to spring it inwardly against its normal tendency to spring outwardly and thereby the tension of the grid wire is imposed on the flange 33. The slots 32 permit this springing movement.

The doors D may be provided with operating handles 35 in any desired manner. I have shown ears 36 cut from sheet metal, forming the door and curving outwardly around the edge of the side plate to the handles 35 which are secured thereto, as by rivets 37.

The final step in the assembly of my toaster casing is to place the U-shaped assembly strip A in position and secure it. The strip A is channel-shaped in cross-section, as shown in Figures 2 and 4, the web thereof being indicated at 38 and 38ª, and the flanges thereof at 39 and 39ª. The web and flanges 38 and 39 extend down the ends of the toaster. The flanges 39 and 39ª cooperate with flanges 40 and 40ª extending along the tops and down the ends of the side plates S. When the flanges 39 cooperate with the flanges 40, and the flanges 39ª cooperate with the flanges 40ª, the side plates S are permanently retained against any further spreading action (in a more rigid manner than the twisting of the ears 29 and the coaction of the U-shaped portion 30 of the grid wires G with the flanges 26 accomplish in a temporary manner during the assembly operations) by the lower ends of the webs 38ª being turned inwardly as at 38ᵇ, to contact with the bottom of the base plate B, and the final step in the assembly is to bend ears 41 on the terminal ends of the webs 38ᵇ upwardly through perforations 42 in the base B. The parts are now held in assembled relation until such time as the ears 41 are removed from the perforations 42 for disassembly purposes.

From the foregoing description it is believed obvious how I have provided a comparatively simple toaster construction wherein a minimum of sheet metal parts are formed, and the operations for assembly are reduced to a minimum. The result is a comparatively inexpensive, yet rugged, toaster casing structure wherein the use of rivets and other fastening means are entirely eliminated. One spot-welding operation is used, and this involves the attachment of an angle-shaped stop strip 43 to each flange 21 of the side plates S, against which the upper edge of the door D engages to prevent the door from swinging too far inwardly in its closed position, and to more completely close the upper edge of the door against the escape of heat.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a toaster, a base plate, a pair of side plates upstanding therefrom and having door openings therein and having spaced vertical flanges at the top and bottom between said door openings, a heating element confined between said flanges, projections on said bottom flanges extending through said heating element to prevent dislocation thereof in a vertical plane, said projections being bent to prevent spreading of the lower ends of said side plates, and grid wires having U-shaped portions at their upper ends which straddle said upper heating element retaining flanges and constrain them to engage against said heating element whereby said upper flanges are retained against spreading.

2. In a toaster, a base plate, a pair of side plates upstanding therefrom and having door openings therein, doors hinged in said openings, said side plates having inwardly extending horizontal flanges at the top and bottom of said door opening and vertical flanges at the inner edges of said horizontal flanges, a heating element confined between said vertical flanges, projections on said vertical flanges extending through said heating element to prevent dislocation thereof in a vertical plane, said projections from said lower vertical flanges being arranged to temporarily prevent spreading of the lower ends of said side plates, grid wires having U-shaped portions at their upper ends straddling said upper vertical flanges to temporarily retain them against spreading, and an assembly strip around the top and ends of said side plates and having its lower ends extending under said base plate and terminating in ears extended upwardly through perforations therein to permanently retain said base plate and side plates assembled.

3. In a toaster, a base plate, a pair of side plates upstanding therefrom and having door openings therein, doors hinged in said openings, said side plates having inwardly extending horizontal flanges at the top and bottom of said door opening and vertical flanges at the inner edges of said horizontal flanges, a heating element confined between said vertical flanges, grid wires having U-shaped portions at their upper ends straddling said upper vertical flanges to temporarily retain them against spreading, and an assembly strip around the top and ends of said side plates and having its lower ends extending under said base plate and terminating in ears extending upwardly through perforations therein to permanently retain said base plate and side plates assembled.

NICHOLAS SCHAFNITZ.

REFERENCES CITED

The following references are of record in the file of this patent:

UNITED STATES PATENTS

| Number | Name | Date |
| --- | --- | --- |
| 2,065,434 | Eaton | Dec. 22, 1936 |
| 1,130,987 | Kuhn | Mar. 9, 1915 |
| 1,533,075 | Lindemann | Apr. 7, 1925 |
| 1,519,176 | Troger | Dec. 16, 1924 |
| 1,753,601 | Eaton | Apr. 8, 1930 |
| 2,061,433 | Murasco | Nov. 17, 1936 |